(12) United States Patent
Wang et al.

(10) Patent No.: US 10,105,787 B2
(45) Date of Patent: *Oct. 23, 2018

(54) SYSTEMS AND METHODS FOR ULTRASONIC WELDING

(71) Applicant: GM Global Technology Operations LLC, Detroit, MI (US)

(72) Inventors: Pei-chung Wang, Troy, MI (US); Susan M. Smyth, Rochester Hills, MI (US); Zhongxia Liu, Zhengzhou (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 130 days.

This patent is subject to a terminal disclaimer.

(21) Appl. No.: 15/161,685

(22) Filed: May 23, 2016

(65) Prior Publication Data

US 2016/0354974 A1   Dec. 8, 2016

Related U.S. Application Data

(60) Provisional application No. 62/172,005, filed on Jun. 5, 2015, provisional application No. 62/207,160, filed
(Continued)

(51) Int. Cl.
*B32B 37/00*     (2006.01)
*B23K 20/10*     (2006.01)
(Continued)

(52) U.S. Cl.
CPC ............ *B23K 20/10* (2013.01); *B23K 20/106* (2013.01); *B23K 20/24* (2013.01); *B23K 20/26* (2013.01); *B29C 65/08* (2013.01); *B29C 65/82* (2013.01); *B29C 65/8253* (2013.01); *B29C 66/0342* (2013.01); *B29C 66/1122* (2013.01); *B29C 66/43* (2013.01); *B29C 66/71* (2013.01); *B29C 66/727* (2013.01); *B29C 66/7212* (2013.01); *B29C 66/81425* (2013.01); *B29C 66/8322* (2013.01); *B29C 66/83221* (2013.01); *B29C 66/91221* (2013.01); *B29C 66/91231* (2013.01);
(Continued)

(58) Field of Classification Search
CPC ...... B23K 20/10; B23K 20/106; B23K 20/26; B29C 65/08; B29C 65/82; B29C 65/8253; B29C 66/0342; B29C 66/1122; B29C 66/43; B29C 66/71; B29C 66/8322; B29C 66/91221; B29C 66/91231; B29C 66/91951; B29C 66/92211; B29C 66/92311; B29C 66/92431
USPC ............................................ 156/73.1, 580.1
See application file for complete search history.

(56) References Cited

U.S. PATENT DOCUMENTS 4,818,313 A * 4/1989 Sundberg .............. B06B 1/0253
156/366
5,435,863 A * 7/1995 Frantz .................. B06B 1/0246
156/358
(Continued)

*Primary Examiner* — James D Sells
(74) *Attorney, Agent, or Firm* — Cynthia R. Parks; Parks IP Law LLC

(57) ABSTRACT

Systems and methods to improve weld quality are described. For example, certain systems and methods described use weld quality monitoring as feedback to an ultrasonic welding process to improve weld quality. Still other systems and methods provide improvement to double sided and single sided ultrasonic welding through the use of selected multiple pulses.

20 Claims, 7 Drawing Sheets

Related U.S. Application Data on Aug. 19, 2015, provisional application No. 62/207,158, filed on Aug. 19, 2015.

(51) Int. Cl.

| | | |
|---|---|---|
| *B23K 20/26* | (2006.01) | |
| *B23K 20/24* | (2006.01) | |
| *B29C 65/08* | (2006.01) | |
| *B29C 65/00* | (2006.01) | |
| *B29C 65/82* | (2006.01) | |
| *B29K 105/08* | (2006.01) | |
| *B29K 307/04* | (2006.01) | |

(52) U.S. Cl.
CPC .. *B29C 66/91951* (2013.01); *B29C 66/92211* (2013.01); *B29C 66/92311* (2013.01); *B29C 66/92431* (2013.01); *B29C 66/92445* (2013.01); *B29C 66/92611* (2013.01); *B29C 66/92921* (2013.01); *B29C 66/9421* (2013.01); *B29C 66/9441* (2013.01); *B29C 66/9592* (2013.01); *B29C 66/961* (2013.01); *B29C 66/963* (2013.01); *B29C 66/964* (2013.01); *B29C 66/7352* (2013.01); *B29C 66/7392* (2013.01); *B29C 66/73774* (2013.01); *B29C 66/73921* (2013.01); *B29C 66/742* (2013.01); *B29C 66/929* (2013.01); *B29C 66/949* (2013.01); *B29K 2105/08* (2013.01); *B29K 2307/04* (2013.01)

(56) References Cited

U.S. PATENT DOCUMENTS

| | | | | |
|---|---|---|---|---|
| 5,658,408 | A | * | 8/1997 | Frantz ............... B29C 66/92921 156/359 |
| 6,036,796 | A | * | 3/2000 | Halbert ................ B06B 1/0223 156/351 |
| 7,523,775 | B2 | * | 4/2009 | Matsumura ............ B23K 20/10 156/359 |
| 8,721,817 | B2 | * | 5/2014 | Klinstein ............. B06B 1/0261 156/64 |

* cited by examiner

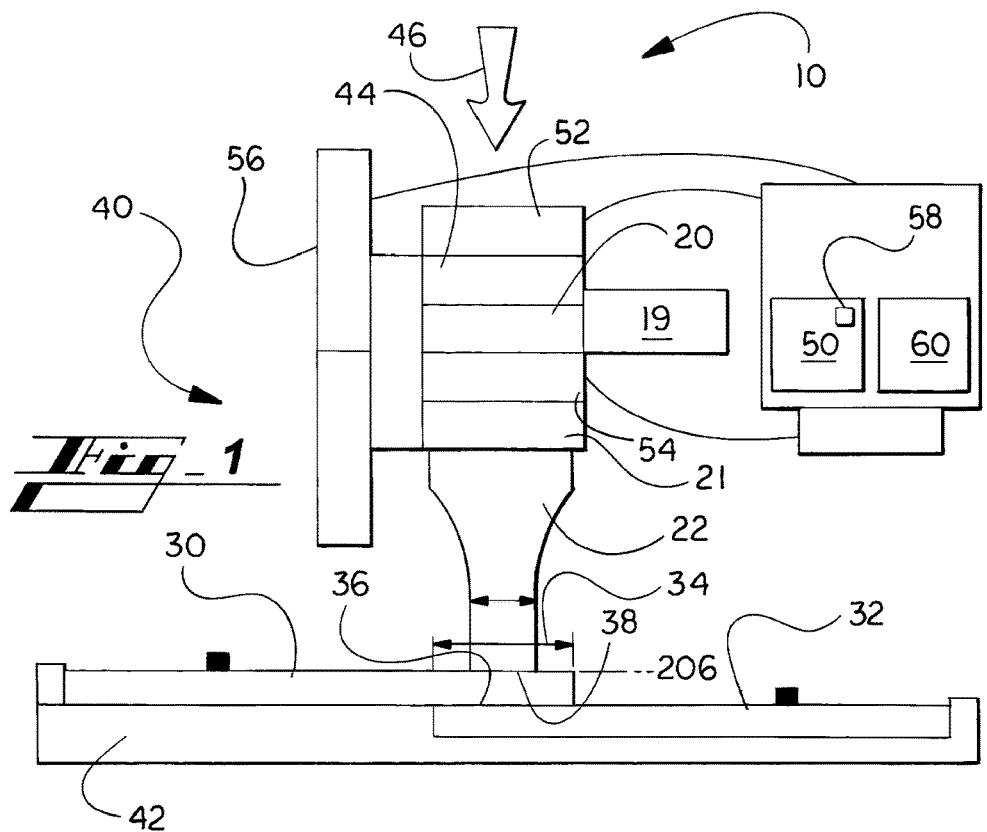
Fig_1
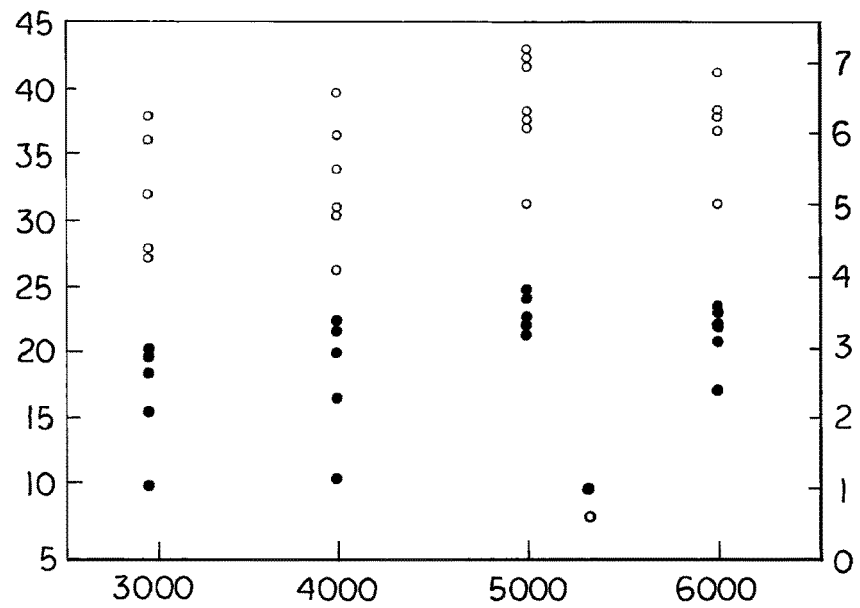
Fig_2

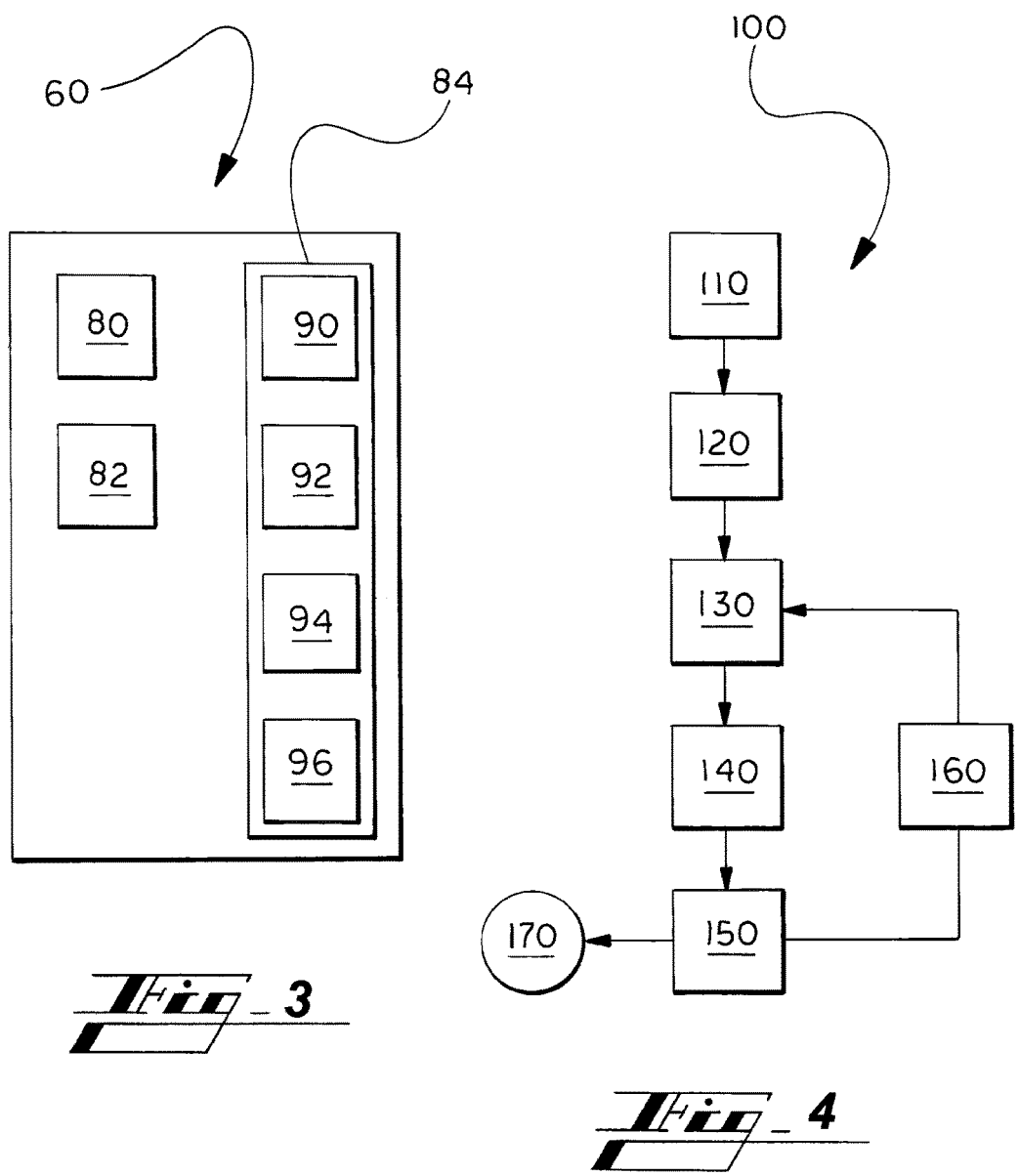

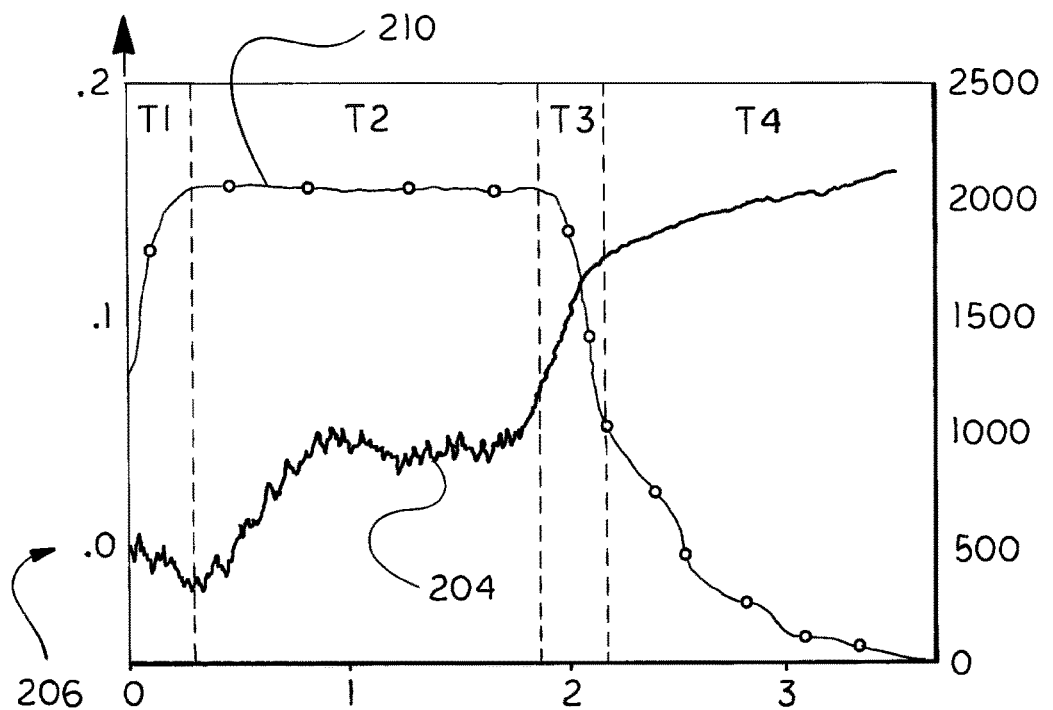
*Fig_7*
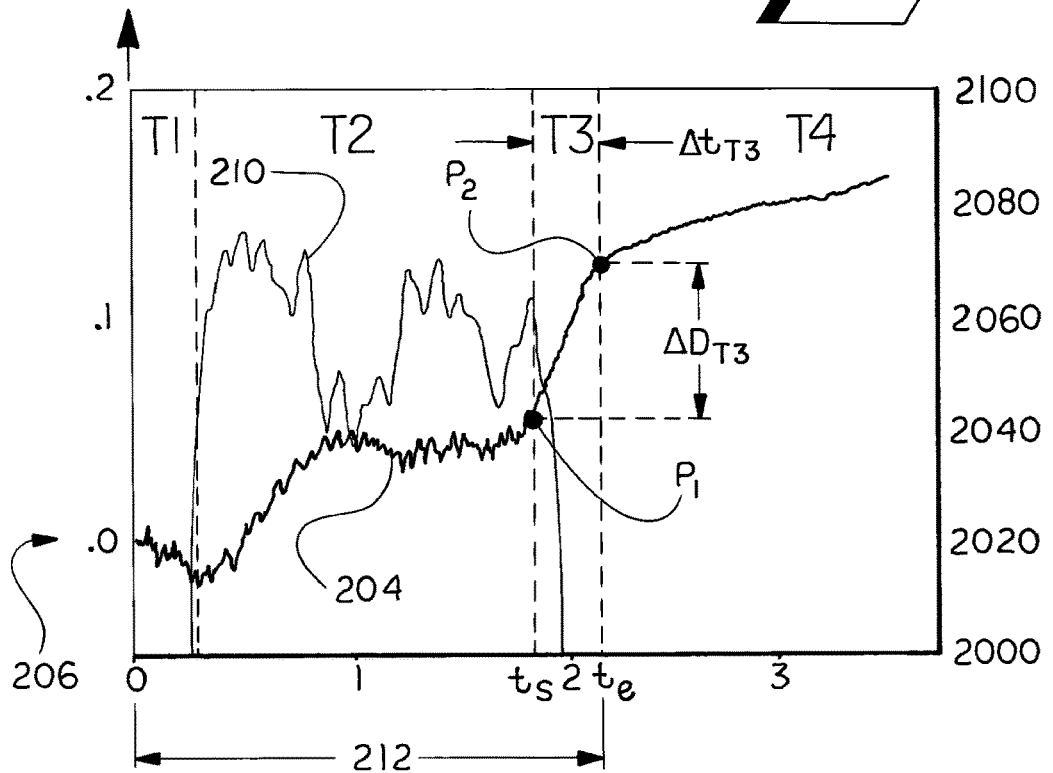
*Fig_8*

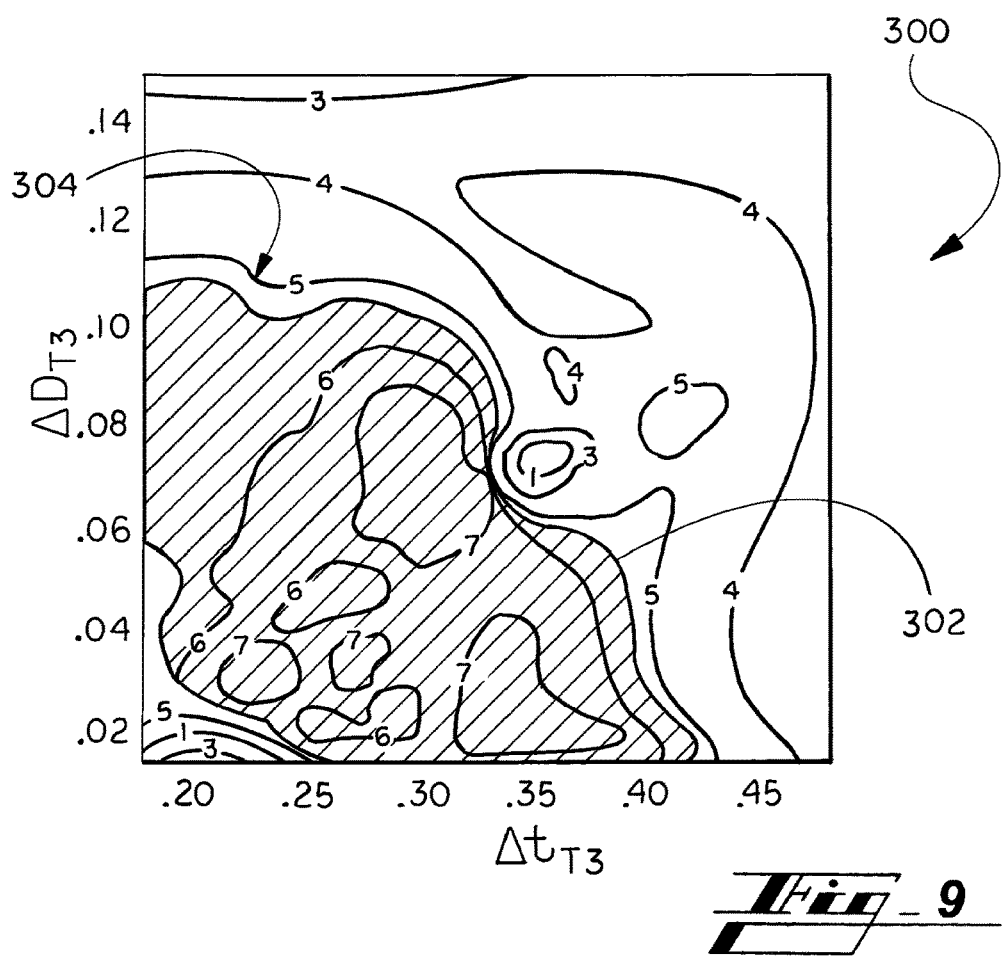
Fig_9
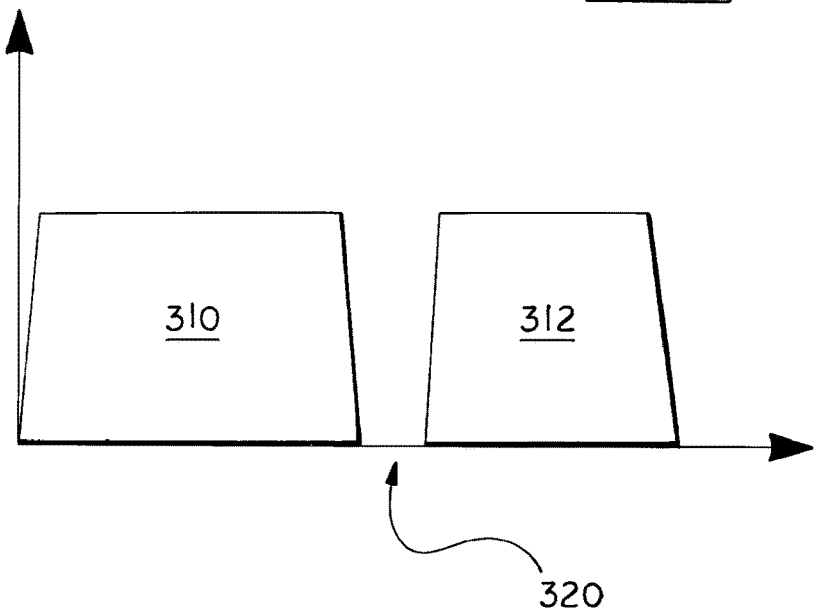
Fig_10

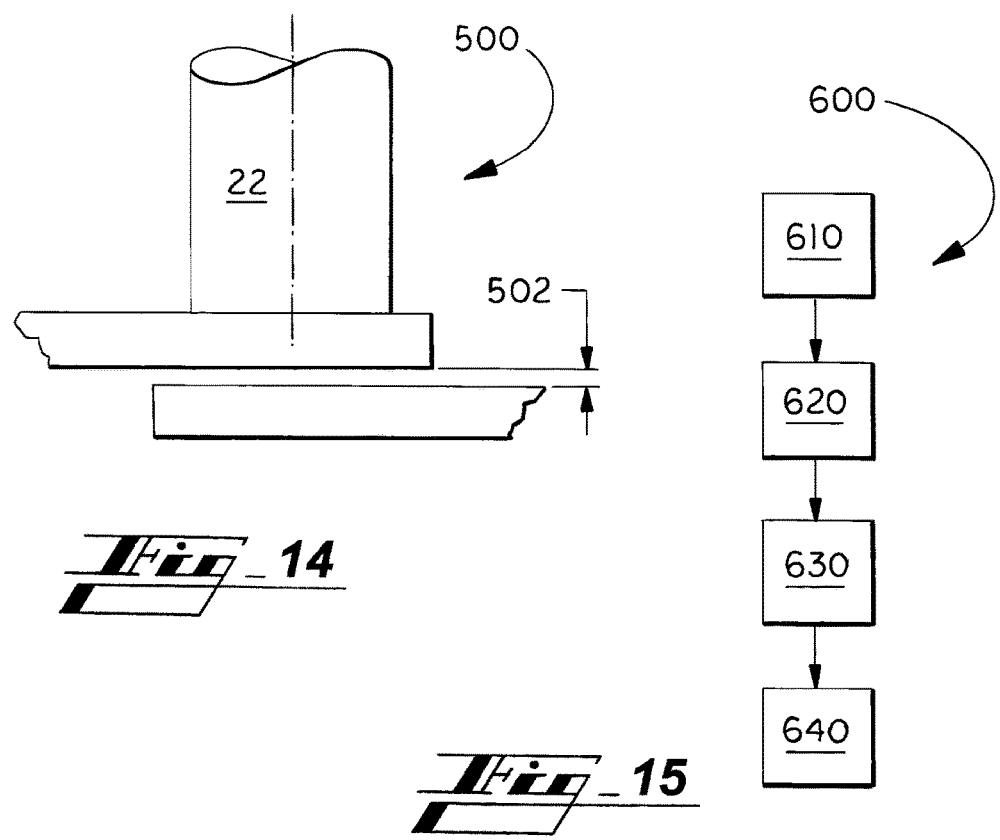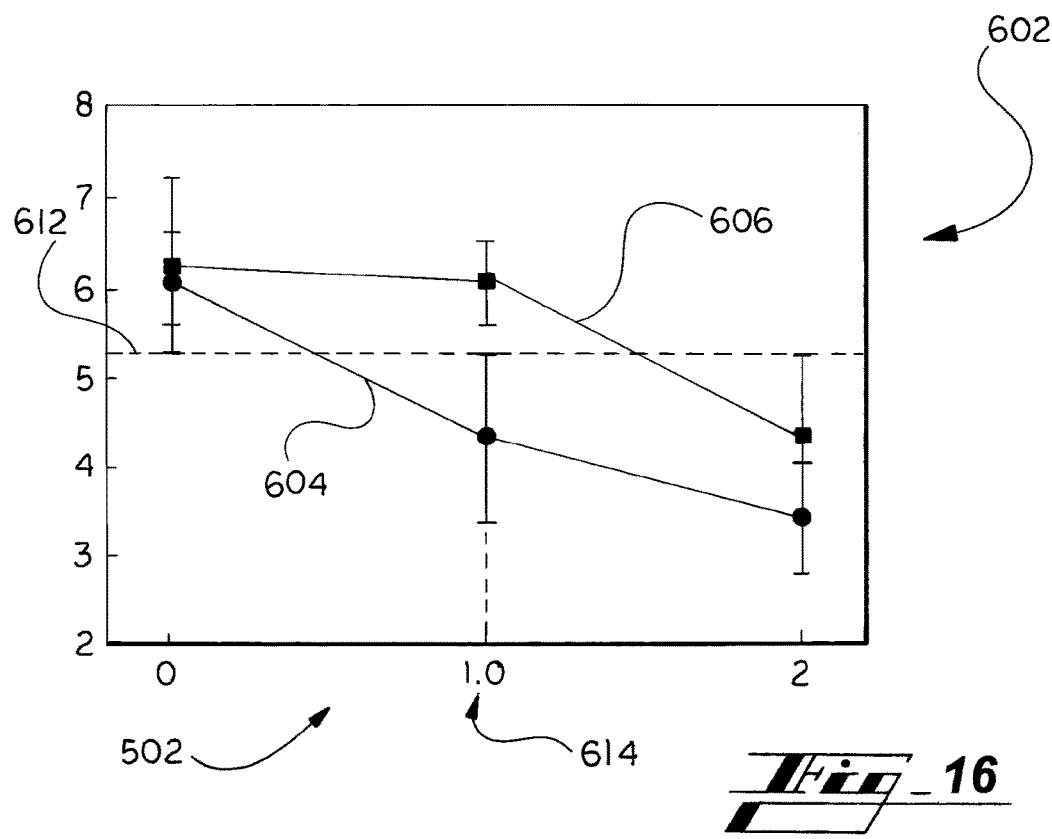

SYSTEMS AND METHODS FOR ULTRASONIC WELDING

CROSS-REFERENCE TO RELATED APPLICATIONS

This application claims priority to U.S. Provisional Patent Application No. 62/172,005 filed Jun. 5, 2015, U.S. Provisional Patent Application No. 62/207,160 filed Aug. 19, 2015, and U.S. Provisional Patent Application No. 62/207,158 filed Aug. 19, 2015, and the entirety of each is hereby incorporated by reference.

TECHNICAL FIELD

The present technology relates generally to connecting workpieces by welding. More specifically, the present technology relates to systems and methods for ultrasonic welding of polymeric composites.

BACKGROUND

Ultrasonic welding is an industrial technique whereby high-frequency ultrasonic acoustic vibrations are locally applied to workpieces being held together under pressure to create a fusion weld. This technique is commonly used for joining similar and dissimilar materials. For example, dissimilar materials include thermoplastic polymers and metal (i.e., metal-polymers). Thermoplastic materials can be joined to metal with proper surface treatment of the metal. The technique is used in industries such as automotive, appliance, electronic, packaging, textile, and medical, among others.

Inconsistent weld quality results from factors including part and material variations. During ultrasonic welding, it can be difficult to determine online weld quality (e.g., weld quality as the weld is formed in real time or without removing workpieces from the welding system). In addition, certain welding systems are not equipped to make measurements to evaluate weld quality. Also, it can be difficult to create quality welds using a single-sided ultrasonic welding process, for example, because of a gap between workpieces.

SUMMARY

The present technology discloses systems and methods to improve weld quality. For example, certain systems and methods described use weld quality monitoring as feedback to an ultrasonic welding process to improve weld quality. Various systems and methods improve double-sided and single-sided ultrasonic welding through the use of multiple select pulses.

According to an exemplary embodiment, a method includes applying pressure, by bringing together an anvil and a horn, to a first workpiece and a second workpiece at an overlapping portion of the workpieces; applying, by the horn as controlled by a controller, a first pulse of ultrasonic vibration to the workpieces until a measured value meets or exceeds a preset threshold value; and measuring, by the controller, a dissipated power over time and a horn position over time during the first pulse.

The method further includes determining, by the controller, (1) a duration of a stage as a difference between: an end time of the stage based on the time when the controller stops ultrasonic vibration; and a start time of a stage based on a drop in the dissipated power over time; (2) a horn displacement during the stage based on a difference between: a first horn position measured at the start time of the stage; and a second horn position measured at the end time of the stage; wherein the horn position over time includes the first horn position and the second horn position; and (3) a weld strength value based on weld strength data, the duration of the stage, and the horn displacement during the stage. The method then includes comparing, by the controller, the weld strength value to a threshold weld strength value.

The method further includes determining, by the controller: (1) if the weld strength value is greater than the threshold weld strength value, that a weld quality is acceptable; and (2) if the weld strength value is less than the threshold weld strength value, that the weld quality is not acceptable. The method is repeated until the weld quality is acceptable. For example, if the weld quality is not acceptable, the method comprises applying, applying, by the horn as controlled by a controller, a second pulse of ultrasonic vibration to the workpieces until a measured value meets or exceeds a preset threshold value, and repeating the measuring, determining, and comparing steps for the second pulse.

The second pulse may be applied after a selected cooling period. In addition, a welding parameter of the second pulse may be adjusted with respect to that of the first pulse. Welding parameters include welding time, welding energy, and welding pressure. For example, adjusting at least one welding parameter includes, if the horn displacement during the stage and the duration of the stage are too low, increasing at least one of welding time, welding energy, and welding pressure.

In certain embodiments, the weld strength data is previously determined and is associated with the workpieces. In certain embodiments, the preset threshold value is one of an amount of weld energy, an amount of welding time, and a horn position relative to a start position.

Other aspects of the present technology will be in part apparent and in part pointed out hereinafter.

DESCRIPTION OF THE DRAWINGS

FIG. 1 illustrates schematically an ultrasonic welding system in accordance with an exemplary embodiment.

FIG. 2 illustrates a graphical representation of a distribution of weld size data and weld strength data.

FIG. 3 illustrates schematically a control system of the welding system of FIG. 1.

FIG. 4 is a flow diagram of a first ultrasonic welding method performed by the welding system of FIG. 1 in accordance with an exemplary embodiment.

FIG. 7 is a graphical illustration of position of a horn of the ultrasonic welding system of FIG. 1 and dissipated power of the ultrasonic welding system of FIG. 1 during the first ultrasonic welding method of FIG. 4.

FIG. 8 is a graphical illustration of position of a horn of the ultrasonic welding system of FIG. 1 and dissipated power of the ultrasonic welding system of FIG. 1 during the ultrasonic welding method of FIG. 4.

FIG. 9 is a graphical illustration of weld strength, displacement of a horn of the ultrasonic welding system of FIG. 1 during a stage T3 of the ultrasonic welding method of FIG. 4, and duration of the stage T3 of the ultrasonic welding method of FIG. 4.

FIG. 10 is graphical illustration of multiple pulses according to the first ultrasonic welding method of FIG. 4.

FIG. 14 illustrates schematically a single-sided ultrasonic welding system in accordance with an exemplary embodiment.

FIG. 15 is a flow diagram of a third ultrasonic welding method performed by the welding system of FIG. 14 in accordance with an exemplary embodiment.

FIG. 16 is a graphical representation of a distribution of weld strength data associated with multiple pulses during the ultrasonic welding method of FIG. 15.

DETAILED DESCRIPTION

Figure 5:
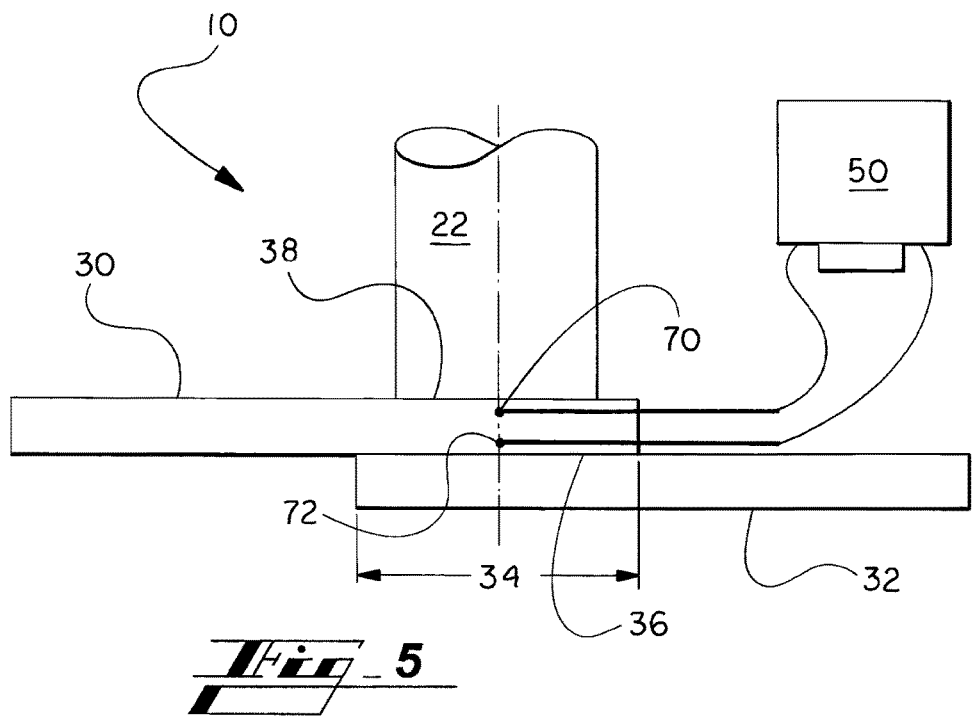
FIG. 5 illustrates schematically the ultrasonic welding system of FIG. 1.

Detailed embodiments of the present disclosure are disclosed herein. The disclosed embodiments are merely examples that may be embodied in various and alternative forms, and combinations thereof. As used herein, for example, exemplary, illustrative, and similar terms, refer expansively to embodiments that serve as an illustration, specimen, model or pattern.

Descriptions are to be considered broadly, within the spirit of the description. For example, references to connections between any two parts herein are intended to encompass the two parts being connected directly or indirectly to each other. As another example, a single component described herein, such as in connection with one or more functions, is to be interpreted to cover embodiments in which more than one component is used instead to perform the function(s). And vice versa—i.e., descriptions of multiple components herein in connection with one or more functions is to be interpreted to cover embodiments in which a single component performs the function(s).

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Overview of the Disclosure

The systems and methods described herein are configured to join workpieces. While ultrasonic welding of polymeric composite workpieces is described as a primary example, herein, the technology can be used in connection with other types of welding and other workpiece materials without departing from the scope of the present disclosure.

For example, ultrasonic welding is generally applicable to workpieces made of materials including polymeric composites, plastics (e.g., both hard and soft plastics such as semicrystalline plastics), carbon-fiber-reinforced polymer (CFRP) sheets and metals (e.g., thin, malleable metals such as aluminum, copper, and nickel). With proper surface treatment of metal, the process can be used to join dissimilar materials (e.g., join a metal to a polymer).

Exemplary workpieces include sheets, studs, projections, electrical wiring hangers, heat exchanger fins, and tubing. For purposes of teaching, methods of joining two sheets of material are described. However, the methods described herein can be used to join more than two sheets of material or more than two workpieces. For example, methods described herein can be applied to joining of multiple workpieces (e.g., more than two workpieces) in a stack-up.

FIGS. 1-2 Welding System

Referring to FIG. 1, a welding system 10 is schematically shown. A transducer 20 (e.g., piezoelectric converter) converts an electrical signal from an electrical generator 19 into mechanical vibrations that are amplified by a booster 21. A horn 22 (e.g., a sonotrode) is connected to the transducer 20. The horn 22 is configured to be placed in contact with workpieces 30, 32 to transfer mechanical vibrations (e.g., ultrasonic waves) from the transducer 20 to the workpieces 30, 32. The horn 22 contacts the first workpiece 30 at a horn-workpiece interface 38.

A support frame 40 of the system 10 includes an anvil 42 (e.g., a nest) and an actuator 44 such as a servo piston 44 that provides vertical movement and positioning of the horn 22 with respect to the anvil 42. An arrow 46 represents a positive direction of movement of the horn 22 in the graphs discussed below. The servo piston 44 can adjust force applied by the horn 22 during a welding process. In alternative embodiments, the actuator includes a pneumatic piston 44. Via the actuator 44, the horn 22 is configured to apply a force (i.e., welding pressure) to the workpieces 30, 32.

For purposes of teaching, referring to FIG. 1, a first workpiece 30 is a first sheet of polymeric composite material and a second workpiece 32 is a second sheet of polymeric composite material. The first workpiece 30 and the second workpiece 32 are overlapped (i.e., overlapping portion 34). In alternative embodiments, the workpieces are arranged to form a butt joint or in configurations to form other joints. A first surface of the first workpiece 30 is positioned against a second surface of the second workpiece 32 at an interface 36, which is also referred to as a faying surface.

The system 10 includes a data acquisition system 50 that is connected to a pressure sensor 52 (or a force sensor), a horn position sensor 54, and a power measurement unit 56. As described in further detail below, the position sensor 54 measures a position relative to a start position (e.g., the start position is when the horn is in contact with the workpiece 30, applying welding pressure, prior to applying ultrasonic vibration). Here, the position relative to the start position may instead be referred to as a displacement but the term relative position is used because the term displacement is used below when referring to the difference in two positions measured by the position sensor 54. The data acquisitions system 50 also includes a timer 58 configured to measure time.

Generally, the data acquisition system 50 records data during an ultrasonic welding method performed by the welding system 10. The data acquisition system 50 is connected to a controller 60 and is configured to provide recorded data to the controller 60 of the welding system 10 to assess weld quality, as described in further detail below.

Particularly, the data acquisition system 50 records each of weld pressure from the pressure sensor 52, weld energy from the power measurement unit 56, and position of the horn 22 from the position sensor 54, each as a function of time. The data acquisition system 50 records each of welding time, hold time, and delay time from the timer 58.

Continuing with FIG. 1, the welding system 10 is configured to perform the methods described herein. Briefly described, the system 10 includes three welding modes referred to as energy mode, time mode, and horn position mode. Each welding mode is characterized by a respective one of preset value of weld energy, welding time, and horn position relative to a start position. Particularly, the preset value of weld energy is used for energy mode, the preset value of welding time is used for time mode, and the preset value of horn position is used for horn-position mode. The preset values are stored in a memory 84 (shown in FIG. 3) for use by the controller 60 as described in further detail below.

The preset values set at least one threshold at which an ultrasonic welding process is stopped. According to an exemplary process, workpieces 30, 32 are welded using a nominal power of the system 10. When the weld energy, welding time, or horn-displacement reaches the preset value for the selected weld mode, ultrasonic wave oscillation is stopped. Weld quality can be controlled—e.g., kept high by avoiding over-application of energy—by the preset values in each selected welding mode.

Referring to FIG. 2, distributions of weld strength and weld area resulting from various weld energies applied to ultrasonic welded thermoplastic composites are illustrated. The left y-axis includes a scale of weld diameter, measured in millimeters (mm), and is associated with the black data points. The right y-axis includes a scale of weld strength, measured in kilonewtons (kN), and is associated with the white data points. The x-axis includes a scale of applied weld energy, measured in joules (J).

As shown, there is significant distribution or scatter in the weld strength and weld area for joints (i.e., welds) made under the same welding conditions and using the same welding parameters. The scatter is at least partially due to variations in weld quality. Welding methods described in further detail below increase weld strength and reduce scatter.

FIG. 3 Control System

Referring to FIG. 3, the controller 60 includes a processor 80 for controlling and/or processing data, input/output data ports 82, and the memory 84. The controller 60 can be referred to by other terms, such as controller unit, controller device, tangible controller, tangible controller device, or similar.

The processor could be multiple processors, which could include distributed processors or parallel processors in a single machine or multiple machines. The processor could include virtual processor(s). The processor could include a state machine, application specific integrated circuit (ASIC), programmable gate array (PGA) including a Field PGA, or state machine. When a processor executes instructions to perform "operations," this could include the processor performing the operations directly and/or facilitating, directing, or cooperating with another device or component to perform the operations.

The controller 60 can include a variety of computer-readable media, including volatile media, non-volatile media, removable media, and non-removable media. The term "computer-readable media" and variants thereof, as used in the specification and claims, includes storage media. Storage media includes volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that is configured to be used to store information that can be accessed by the controller 60.

While the memory 84 is illustrated as residing proximate the processor 80, it should be understood that at least a portion of the memory can be a remotely accessed storage system, for example, a server on a communication network, a remote hard disk drive, a removable storage medium, combinations thereof, and the like. Thus, any of the data, applications, and/or software described below can be stored within the memory and/or accessed via network connections to other data processing systems (not shown) that may include a local area network (LAN), a metropolitan area network (MAN), or a wide area network (WAN), for example.

The memory 84 includes several categories of software and data used in the controller 60, including applications 90, a database 92, an operating system 94, and input/output device drivers 96.

As will be appreciated by those skilled in the art, the operating system 94 may be any operating system for use with a data processing system. The input/output device drivers 96 may include various routines accessed through the operating system 94 by the applications to communicate with devices, and certain memory components. The applications 90 can be stored in the memory 84 and/or in a firmware (not shown) as executable instructions, and can be executed by the processor 80.

The applications 90 include various programs that, when executed by the processor 80, implement the various features of the controller 60. The applications 90 include applications for performing the methods described herein. The applications 90 are stored in the memory 84 and are configured to be executed by the processor 80.

The applications 90 may use data stored in the database 92, such as that which is received via the input/output data ports 82. The database 92 includes static and/or dynamic data used by the applications 90, the operating system 94, the input/output device drivers 96 and other software programs that may reside in the memory 84.

It should be understood that FIG. 3 and the description above are intended to provide a brief, general description of a suitable environment in which the various aspects of some embodiments of the present disclosure can be implemented. The terminology "computer-readable media", "computer-readable storage device", and variants thereof, as used in the specification and claims, can include storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium, excluding propagating signals, that can be used to store information that can be accessed by the device shown in FIG. 3.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, mini-computers, mainframe computers, personal computers, hand-held computing devices, microprocessor-based, programmable consumer electronics, combinations thereof, and the like.

FIG. 4 First Ultrasonic Welding Method

Referring to FIG. 4, according to an ultrasonic welding method 100, the ultrasonic welding system 10 (FIG. 1) is used to join the first workpiece 30 and the second workpiece 32.

According to a first block 110 of the method 100 of FIG. 4, the workpieces 30, 32 (FIG. 1) are positioned on a tooling surface of the anvil 42. The overlapping portion 34 of the workpieces 30, 32 is positioned between the horn 22 and the anvil 42.

According to a second block 120, the anvil 42 and the horn 22 are brought together to apply pressure for the welding (which can be referred to as welding pressure) to the workpieces 30, 32 at the overlapping portion 34. The anvil 42 and the horn 22 press the first workpiece 30 and the second workpiece 32 together at the faying interface 36.

According to a third block 130, as the workpieces 30, 32 are held together under pressure, the controller 60 applies a pulse of ultrasonic vibration to the workpieces 30, 32 via the horn 22. Heat from ultrasonic vibration (i.e., heat from friction between the workpieces, and intermolecular vibration) melts material of the first workpiece 30 and of the second workpiece 32 at the interface 36. Ultrasonic vibration causes local melting of material due to absorption of vibrational energy. The vibrations are introduced across the interface 36 (e.g., the joint to be welded).

According to a fourth block 140, referring to the modes described above, a measured value meets or exceeds a preset threshold value and the pulse of ultrasonic vibration is stopped. Once the ultrasonic vibration is stopped, the melt begins to solidify and the workpieces 30, 32 are joined at the faying (e.g., overlapping, contacting) surfaces (i.e., interface 36). The method is now described in further detail with respect to the temperature response of the workpieces 30, 32.

Figure 6:
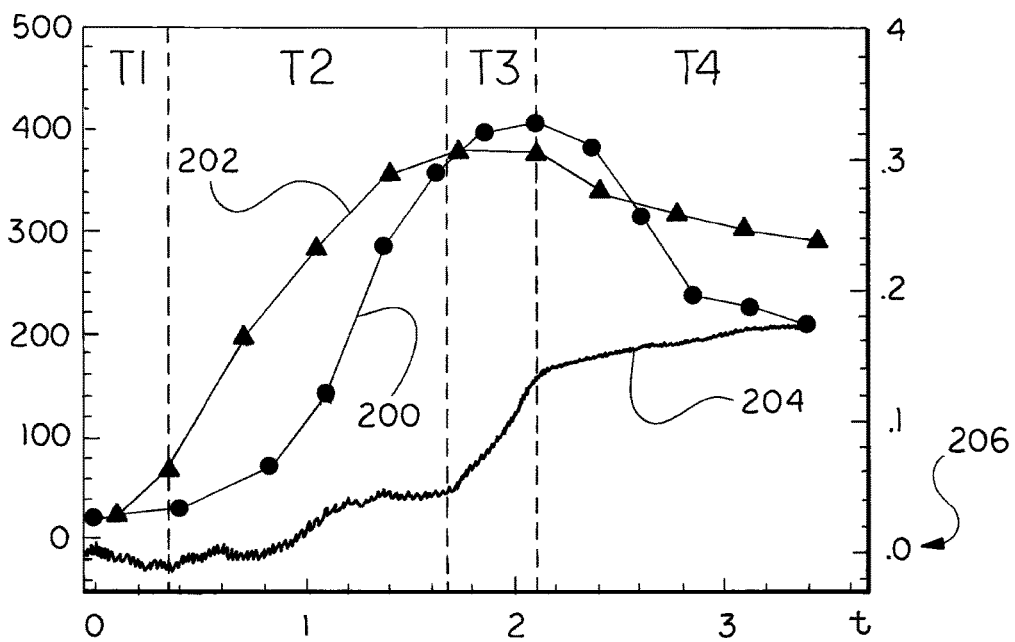
FIG. 6 is a graphical illustration of temperature at points on workpieces during the first ultrasonic welding method of FIG. 4.

FIGS. 5 and 6 Temperature Response

Referring to FIG. 5, the system 10 includes thermocouples 70, 72 for measuring temperature at the horn-workpiece interface 38 and the workpiece-workpiece interface 36 (i.e., faying interface). The thermocouples 70, 72, are positioned at the horn-workpiece interface 38 and the faying interface 36 and are connected to the data acquisition system 50.

The data acquisition system 50 in various embodiments records temperature and/or horn displacement as a function of time during the ultrasonic welding method 100 (FIG. 4). FIG. 6 represents temperature by the left y-axis (measured in degrees Celsius (C)) and horn displacement by the right y-axis (measured in millimeters (mm)), each as a function of time t (measured in seconds (s)) represented by the x-axis. Temperature 200 at the horn-workpiece interface 38 is measured by the thermocouple 70 and temperature 202 at the faying interface 36 is measured at by the thermocouple 72. The temperature over time at each of the horn-workpiece interface 38 and the workpiece-workpiece interface 36 during the ultrasonic welding method 100 is now described in further detail with respect to a series of time stages T1, T2, T3, and T4.

During a stage one T1, ultrasonic a pulse of ultrasonic vibration begins and coulomb friction between the horn-workpiece interface 38 and workpiece-workpiece interface 36 results in an increase in temperatures 200, 202.

During a stage two T2, coulomb friction is no longer the main heating source and viscoelastic heating of the material becomes dominant. The temperature 202 near the faying interface 36 increases approximately linearly with the welding time and reaches a peak temperature near the end of the stage two T2.

During a stage three T3, as the temperature 202 near the faying interface 36 stabilizes, the temperature 200 near the horn-workpiece interface 38 increases with time. As the horn 22 indents into the upper workpiece 30, a melt film forms and some molten materials are fleshed out of the faying interface 36. As a result, a horn displacement (e.g., a sharp increase in horn relative position 204) is observed in the stage three T3. Under this condition, the melt rate of materials is in equilibrium with the spread rate of the melt.

During a stage four T4, according to the fourth block 140 (FIG. 4), the controller 60 stops the ultrasonic vibration and the melt begins to solidify. Each of the temperature 202 of the faying interface 36 and the temperature 200 of the horn-workpiece interface 38 decreases with time as the horn 22 moves slightly downward (e.g., positive direction as indicated by the arrow 46 in FIG. 1; horn relative position 204 increases relative to a start position 206) resulting primarily from material contraction. As such, the weld initiation and growth depend on the energy consumed by the materials of the workpieces 30, 32 at the faying interface 36.

FIGS. 7-10 Dissipated Power and Horn Displacement

Continuing with FIG. 7, dissipated power 210 and relative position 204 of the horn 22 during the ultrasonic welding method 100 are described in further detail. FIG. 7 represents position of the horn 22 relative to a start position (206) by the left y-axis (measured in millimeters (mm)) and dissipated power by the right y-axis (measured in watts (W)), each as a function of time t (measured in seconds (s)) represented by the x-axis. During the third block 130, dissipated power 210 is measured by the power measure unit 56 and relative position 204 of the horn 22 is measured by the position sensor 54. The dissipated power is the power is transmitted to (or absorbed by) the workpieces 30, 32.

In FIG. 7, the dissipated power 210 in stage one T1 linearly increases as coulomb friction occurs at the horn-workpiece interface 38 and at the faying interface 36.

In stage two T2, as ultrasonic welding continues, more and more asperities at the faying interface 36 become molten and the dissipated power 210 reaches a maximum value. As a result of the heating, the workpieces 30, 32 expand at the beginning of stage two T2, and the horn 22 moves upward (e.g., upward direction is negative, or opposite the direction indicated by arrow 46 in FIG. 1; horn relative position 204 decreases relative to the start position 206). Further along in stage two T2, as a result of continued heating of the workpieces 30, 32, the expansion of the workpieces 30, 32 ends as asperities are melted and the horn 22 moves downward.

In stage three T3, asperities are melted at the faying interface 36 and a melt film is formed. As the melt rate and spread rate of material at the faying interface 36 are in equilibrium, less vibration energy is required to melt the material at the faying interface 36 to compensate the spread melt. Because of formation of the melt at the faying interface 26, the relative position 204 of the horn 22 increases over time (i.e., displaces) and dissipated power 210 decreases with time until the ultrasonic vibration is stopped at the end of stage three T3.

FIG. 8 shows another example of horn position and dissipated power. FIG. 8 again represents position 204 of the horn 22 relative to a start position (206) by the left y-axis (measured in millimeters (mm)) and dissipated power 210 by the right y-axis (measured in watts (W)), each as a function of time t (measured in seconds (s)) represented by the x-axis.

Referring to FIG. 8, the controller 60 determines a horn displacement ($\Delta D_{T3}$) in stage three T3 and a duration ($\Delta t_{T3}$) of stage three T3. The horn displacement ($\Delta D_{T3}$) in stage three T3 is determined based on the difference in a first horn position (p1) at a starting time (ts) of the stage three T3 and a second horn position (p2) at an end time (te) of the stage three T3. Particularly, the horn relative position 204 at starting time (ts) is the first horn position (p1) and the horn relative position 204 at end time (te) is the second horn position (p2). The difference in the starting time (ts) of the stage three T3 and the end time (te) of the stage three T3 is the duration $\Delta t_{T3}$ of stage three T3.

The controller 60 determines the starting time (ts) of the stage three T3 based on a change in dissipated power 210. Referring to FIG. 8, the melt of asperities with various heights at the faying interface 36 result in a series fluctuation of dissipated power 210 in stage two T2. A melt film forms and the dissipated power 210 drops dramatically in stage three T3. The controller 60 selects the time corresponding to the sharp drop in dissipated power, for example, as the starting time (ts) of stage three T3. The controller 60 selects the end time (te) of stage three T3, for example, as the time when controller 60 stops applying ultrasonic vibration. As described above, the controller 60 stops applying ultrasonic vibration when one of a measured weld energy, a measured welding time 212, or a measured horn relative position 204 reaches or exceeds a respective preset value.

Referring to FIG. 9, weld strength data 300 includes, for each of numerous welds resulting from the ultrasonic welding method 100, a weld strength value (e.g., based on weld strength tests) that is associated with each of a stage three duration ($\Delta t_{T3}$) value and a stage three horn displacement ($\Delta D_{T3}$) value. As such, stage three duration ($\Delta t_{T3}$) and stage three horn displacement ($\Delta D_{T3}$) are correlated to weld strength. Using the weld strength data 300, a weld strength value can be determined based on a stage three duration value and a stage three horn displacement value.

Referring to FIG. 9, a graphical contour representation of weld strength data 300 is shown. FIG. 9 represents borders between different levels of weld strength with contour lines (labeled in kilonewtons (kN)). The contour lines are drawn with respect to weld strength values. Each weld strength value is plotted on the graph of FIG. 9 using an associated stage three horn displacement ($\Delta D_{T3}$) value and an associated stage three duration ($\Delta t_{T3}$) value. Particularly, the associated stage three horn displacement ($\Delta D_{T3}$) value is plotted along the y-axis (measured in millimeters (mm)) and the associated stage three duration ($\Delta t_{T3}$) value is plotted along the right x-axis (measured in seconds (s)).

Continuing with FIG. 9, a quality weld is determined as one that exceeds a selected threshold weld strength value 302 (e.g., values in a zone 304, which is represented by hatched shading). In the contour plot of FIG. 9, the threshold weld strength value 302 is illustrated at 5.2 kN for welded 4 mm thick carbon fiber composites with 30% weight fiber. Those welds that exceed the selected threshold weld strength generally fall in a certain range of stage three duration ($\Delta t_{T3}$) values and generally fall in a certain range of stage three horn displacement ($\Delta D_{T3}$) values.

A weld with a small stage three horn displacement ($\Delta D_{T3}$) value generally has a thin film thickness, and consequently has weak strength. A weld with a long stage three duration ($\Delta t_{T3}$) value and a large stage three horn displacement ($\Delta D_{T3}$) value generally has a thick fusion zone and significant air bubbles in the fusion zone. Both the thick fusion zone and the air bubbles have a negative impact on joint strength and are discussed below with respect to FIG. 11.

Referring again to FIG. 4, according to a fifth block 150 of the ultrasonic welding method 100, the controller 60 determines the dissipated power 210 and the horn relative position 204 measured during the first pulse (e.g., the third block 130). The controller 60 determines the start time (ts) of the stage three T3 based on the dissipated power 210 over time, as described above. The controller 60 determines the end time (te) of the stage three T3 as the time when the controller 60 stops ultrasonic vibration, as described above.

The controller 60 determines the stage three duration ($\Delta t_{T3}$) as the difference between the end time (te) of the stage three T3 and the start time (ts) of the stage three T3. The controller 60 determines the stage three horn displacement ($\Delta D_{T3}$) based the horn position 204 measured over time, the start time of the stage three T3, and the end time of the stage three T3. Particularly the stage three horn displacement ($\Delta D_{T3}$) is based on the difference in the first horn position (p1) at the starting time (ts) of the stage three T3 and the second horn position (p2) at the end time (te) of the stage three T3.

The controller 60 determines weld quality based on the weld strength data 300, the stage three horn displacement ($\Delta D_{T3}$) value, and the stage three duration ($\Delta t_{T3}$) value. For example, the controller determines a weld strength value based on the weld strength data 300 previously determined associated with the workpieces 30, 32, the measured stage three horn displacement ($\Delta D_{T3}$), and the measured stage three duration ($\Delta t_{T3}$) and then compares the weld strength value to the threshold weld strength value 302. If the determined weld strength value is greater than the threshold weld strength value 302, the weld quality is acceptable. If the determined weld strength value is less than the threshold weld strength value 302, the weld quality is not acceptable.

Referring to FIG. 9, the threshold weld strength value 302 defines a boundary of a zone 304 (e.g., the threshold weld strength value 302 is 5.2 kN for welded 4 mm thick carbon fiber composites with 30% weight fiber). If a point defined on the graph of FIG. 9 by a stage three horn displacement ($\Delta D_{T3}$) value and a stage three duration ($\Delta t_{T3}$) value falls in the area of the zone 304, the weld quality of the associated joint is acceptable. If a data point defined by a stage three horn displacement ($\Delta D_{T3}$) and a stage three duration ($\Delta t_{T3}$) falls outside the area of the zone 304, the weld quality of the associated joint is not acceptable.

In response to a determination that weld quality is not acceptable (e.g., a fault indicator such as an alarm or flag), a second pulse 312 follows the first pulse 310 (e.g., each pulse is described with respect to blocks 130, 140), as shown in FIG. 10. In FIG. 10, the y-axis is vibration and the x-axis is time. As described in further detail below, multiple pulses can improve joint strength, increase weld area, and reduce or remove pores in porous zones.

As shown in FIG. 4, in response to determining at the fifth block 150 that weld quality is not acceptable, a sixth block 160 leads back to the third block 130 and blocks 130, 140 are repeated to apply the second pulse 312 (or the subsequent pulse if more than two pulses are applied). Generally, a subsequent pulse (e.g., pulse 312) is applied after the joint cools partially or completely from the previous pulse (e.g., pulse 310). For example, referring to FIG. 10, a cooling period 320 is between the first pulse 310 and the second pulse 312.

For a subsequent pulse, welding parameters can be adjusted to adjust the stage three horn displacement ($\Delta D_{T3}$)

value and a stage three duration ($\Delta t_{T3}$) value. Welding parameters include the welding time, welding energy, and welding pressure. For example, if the stage three horn displacement ($\Delta D_{T3}$) value and the stage three duration ($\Delta t_{T3}$) value are too low, increasing one or more of welding time, welding energy, and welding pressure generally increases the stage three horn displacement ($\Delta D_{T3}$) value and the stage three duration ($\Delta t_{T3}$) value.

After the second pulse 312, the fifth block 150 is repeated to determine if a third pulse is needed. In this manner, blocks 130, 140, 150 can be repeated (e.g., via sixth block 160) until the result of the fifth block 150 step is acceptable joint quality and, for example, in response to a pass indicator, the ultrasonic welding method 100 ends at seventh block 170.

Here, if needed, multiple pulses are applied. The multiple-pulse method produces quality welds more consistently than a single pulse method. For example, single pulse methods generally use larger welding parameters, which can stall the ultrasonic welding system and cause severe weld indentation. A multiple-pulse method, with cooling between the pulses, can use smaller welding parameters. For at least this reason, the multiple-pulse improves process robustness and weld quality as compared to a single pulse method.

The ultrasonic welding method 100 permits easy and efficient production of a series of substantially sound welds without interruption of the welding operation or stoppage of the welding process to check the strength of a joint offline.

Figure 11:
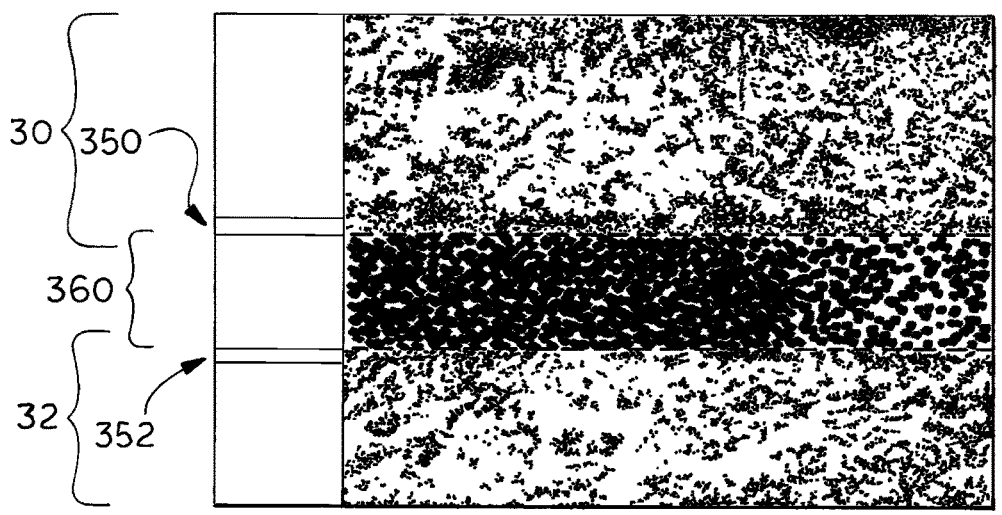
FIG. 11 is a schematic illustration of a cross section of workpieces after a first pulse of an ultrasonic welding method.

FIGS. 10-11 Multiple Pulses

Referring to FIGS. 10 and 11, as described above, multiple pulses 310, 312 can improve joint strength, increase weld area, and reduce pores in porous zones 350, 352. Referring to FIG. 11, after the first pulse 310, porous zones 350, 352 may be located at a periphery of a fusion zone 360 (i.e., weld) of the workpieces 30, 32. The second pulse (or subsequent pulses) fuse the area at the periphery of the weld 360, removing or reducing the porous zones 350, 352.

Figures 12, 13:
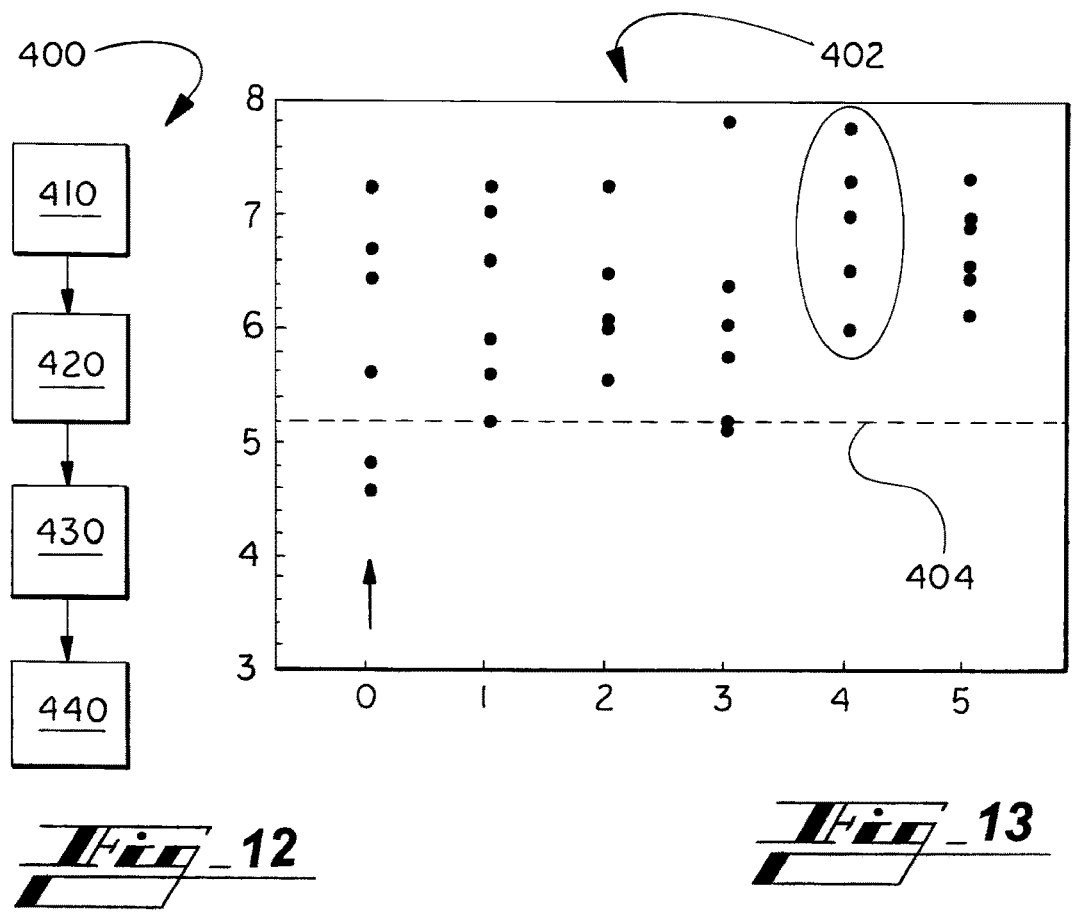
FIG. 12 is a flow diagram of a second ultrasonic welding method performed by the welding system of FIG. 1 in accordance with an exemplary embodiment.
FIG. 13 illustrates a graphical representation of distribution of weld strength data associated with multiple pulses during the second ultrasonic welding method of FIG. 12.

FIGS. 12-13 Second Ultrasonic Welding Method

Referring to FIG. 12, a second ultrasonic welding method 400 is now described. According to the second ultrasonic welding method 400, the welding system 10 is used to join the first workpiece 30 and the second workpiece 32.

According to a first block 410, the controller 60 selects welding parameters (e.g., welding time, welding energy, and welding pressure) of multiple pulses (e.g., two pulses 310, 312 as shown in FIG. 10) prior to applying the pulses. The controller 60 selects welding parameters to generate a quality weld. For example, the controller 60 selects welding parameters (e.g., commonly referred to as a weld schedule) based on the material of the workpieces 30, 32, a threshold weld strength value 404, and minimizing energy and time.

The thickness of the workpieces 30, 32 and the material of the workpieces 30, 32 are "fit-up" conditions. For example, "fit-up" conditions relate to how the joint is fit-up for welding. Using the fit up conditions and the threshold weld strength value, a weld schedule can be determined to create a weld that meets the threshold weld strength value. The weld schedule is determined based on the weld strength data 402 described in further detail below.

For example, to meet a joint strength requirement of 1400 lb. force for ultrasonic welded 3.3 mm thick carbon fiber composites, a weld schedule can include (1) a first pulse with welding energy of 1100 J, a horn force 150 lb for 0.25 seconds and then of 200 lb for 0.25 seconds; (2) cooling for a period of time (e.g., 2 seconds); and (3) a second pulse with welding energy 700 J.

Referring to FIG. 13, for 4 mm thick Carbon Fiber Nylon 66 Composite with 30% weight fiber, weld strengths (plotted along the y-axis in kilonewtons (kN)) are illustrated that result from the second ultrasonic welding method 400 where a first pulse 310 has an energy of 5 kilojoules (kJ) and a second pulse 312 has an energy of 0-5 kJ (the second pulse is plotted along the x-axis in kilojoules (kJ); here, "zero" energy of the second pulse 312 represents the weld strength for just the first pulse 310). The resulting weld strengths vary based on various welding parameters including the welding energy of the first pulse 310 and the welding energy of the second pulse 312.

FIG. 13 illustrates that, keeping the welding energy of the first pulse 310 constant at 5 kJ, the welding energy of the second pulse 312 can be selected to reduce the variation of the weld strengths based on various factors. In addition, the energy of the second pulse 312 can be selected such that the resulting weld strengths are above a selected threshold weld strength value 404.

As an example, the controller 60 receives an indication that the material is 4 mm thick Carbon Fiber Nylon 66 Composite with 30% weight fiber and that a threshold weld strength value 404 is 5.2 kN. The controller 60 further accesses weld strength data 402 based on the material. Using the weld strength data 402, the controller 60 selects the energy of the first pulse 310 as 5 kJ and selects the energy of the second pulse 312 based on the threshold weld strength value 404 and minimizing the energy of the second pulse 312. For example, the controller 60 selects the energy of the second pulse 312 as the lowest one of the energies of the second pulse 312 that has a distribution that is above the threshold weld strength value 404 (e.g., to a statistical confidence level such as 95% or 99%). In the example of FIG. 13, the controller selects the energy of the second pulse 312 to be 4 kJ as indicated by the circled data points. Here, 2 kJ is not selected because the distribution at 2 kJ is not above the threshold weld strength value 404 to a statistical confidence level and 5 kJ is not selected because 4 kJ is less energy.

According to certain embodiments, the controller 60 selects welding parameters for more than two pulses.

Continuing with FIG. 13, generally, the second pulse 312 both reduces the variation of the resulting weld strength and increases the weld strength. Particularly, the second pulse 312 improves the weld strength of welds that are most negatively affected by factors other than the energy of the pulses 310, 312 (e.g., those weld results at the bottom of the distribution).

Referring again to FIG. 12, according to a second block 420, the workpieces 30, 32 are positioned on a tooling surface of the anvil 42. The overlapping portion 34 of the workpieces 30, 32 is positioned between the horn 22 and the anvil 42.

According to a third block 430, the anvil 42 and the horn 22 are brought together to apply pressure for welding (or, welding pressure) to the workpieces 30, 32 at the overlapping portion 34. The anvil 42 and the horn 22 press the first polymeric composite sheet 30 and the second polymeric composite sheet 32 together.

According to a fourth block 440, the horn 22 applies the first pulse 310. Referring to the modes described above, the first pulse 310 is applied until a measured value meets or exceeds a preset threshold value. Once the first pulse 310 is stopped, the weld cools. The weld is cooled for a selected amount of time referred to as a cooling period 320. After the cooling period 320, the horn 22 applies the second pulse 312 until a measured value meets or exceeds a preset threshold value.

FIGS. 14-16 Third Ultrasonic Welding Method

Each of the first ultrasonic welding method 100 and the second ultrasonic welding method 400 described above is a two-sided ultrasonic welding method that uses a horn 22 and an anvil 42. Referring to FIGS. 14 and 15, a welding system 500 for use according to a third ultrasonic welding method 600 is similar to the two-sided welding system 10 except it does not include the anvil 42. The third ultrasonic welding method 600 is a single-sided welding method that uses the horn 22 to apply welding pressure.

In a single-sided ultrasonic welding method, clamping is applied to the workpieces 30, 32 around the location where the weld is to be formed. However, gaps often exist between the workpieces 30, 32 because of improper clamping and/or part distortion resulting from molding. The force applied by the horn 22 from one side (single-sided ultrasonic welding method) is less effective than the force applied from both sides by a horn 22 and an anvil 42 (double-sided ultrasonic welding method) to reduce or eliminate this gap. Workpieces 30, 32 may not be in intimate contact as preferred under a force applied by the horn 22 during a single-sided ultrasonic welding method.

FIG. 16 graphically illustrates weld data 602. FIG. 16 represents joint strength by the y-axis (measured in kilonewtons (kN)) and the gap 502 by the x-axis (measured in millimeters (mm)). The data points represented by circles represent weld strengths resulting from a single pulse (data points connected by line 604) and the data points represented by squares represent weld strengths resulting from a double pulse (data points connected by line 606). In addition, each of a threshold weld strength value 612 and a maximum expected gap value 614 is shown.

Referring to FIG. 16, weld strength generally decreases with an increase in the gap 502 between the workpieces 30, 32. However, comparing line 604 to line 606, multiple pulses (e.g., see pulses 310, 312 in FIG. 10) increases the weld strength of a joint where there is the gap 502 between workpieces 30, 32.

Referring to FIG. 15, the third ultrasonic welding method 600 is now described in detail.

According to a first block 610, the controller 60 selects welding parameters (e.g., welding time, welding energy, and welding pressure) along with a number of pulses. The controller 60 selects welding parameters and number of pulses to generate a quality weld. For example, the controller 60 selects welding parameters and the number of pulses based on the material of the workpieces 30, 32, a threshold weld strength value 612, a maximum expected gap value 614, and minimizing energy and time.

As an example, referring to FIG. 16, the controller 60 receives an indication that the material is 30% Carbon Fiber in Nylon 6/6 with a thickness of 4 mm, that a threshold weld strength value 612 is 5.2 kN, and that a maximum expected gap 614 is one millimeter. The controller 60 accesses weld strength data 602 based on the material.

Using the weld strength data 602, the controller 60 selects the number of pulses based on the threshold weld strength value 612 and the maximum expected gap value 614. In the example of FIG. 16, the controller 60 selects the number of pulses to be two. Here, two pulses increases the joint strength to about 6 kN for a gap of one millimeter, thereby clearing the threshold weld strength value 612 of 5.2 kN.

In FIG. 16, a first pulse with a first welding energy and welding time and a second pulse with a second welding energy and welding time are illustrated for different gaps 502. However, the weld strength data 602 can include data associated with more than two pulses and as well as data for various welding energy and welding times. As such, selection of a joint strength data point based on maximum expected gap value 614 and threshold weld strength value 612 can be optimized to determine the number of pulses, the welding energies of the pulses, and the welding times of the pulses that will, for example, use the minimum amount of energy or time.

According to a second block 620, the horn 22 is positioned near the overlapping portion 34 of the workpieces 30, 32.

According to a third block 630, the horn 22 is brought into contact with the overlapping portion 34 to apply a force (i.e., welding pressure) to the workpieces 30, 32 at the overlapping portion 34.

According to a fourth block 640, the horn 22 applies the first pulse 310. Referring to the modes described above, the first pulse 310 is applied until a measured value meets or exceeds a preset threshold value. Once the first pulse 310 is stopped, the weld cools. The weld is cooled for a selected amount of time referred to as a cooling period 320. After the cooling period 320, the horn 22 applies the second pulse 312 until a measured value meets or exceeds a preset threshold value.

Select Features

Many features of the present technology are described herein above. The present section presents in summary some selected features of the present technology. It is to be understood that the present section highlights only a few of the many features of the technology and the following paragraphs are not meant to be limiting.

Benefits of the present technology include, but are not limited to, an ability to monitor weld quality online. Another example advantage is found in using weld quality monitoring as feedback to an ultrasonic welding process to improve weld quality. Still another example advantage is improvement of double sided and single sided ultrasonic welding through the use of selected multiple pulses.

CONCLUSION

Various embodiments of the present disclosure are disclosed herein. The disclosed embodiments are merely examples, which may be embodied in various and alternative forms, and combinations thereof, set forth for a clear understanding of the principles of the disclosure.

Directional references are provided herein mostly for ease of description and for simplified description of the example drawings, and the systems described can be implemented in any of a wide variety of orientations. References herein indicating direction are not made in limiting senses. For example, references to upper, lower, top, bottom, or lateral, are not provided to limit the manner in which the technology of the present disclosure can be implemented. While an upper surface may be referenced, for example, the referenced surface can, but need not be, vertically upward, or atop, in a design, manufacturing, or operating reference frame. The surface can in various embodiments be aside or below other components of the system instead, for instance.

Variations, modifications, and combinations may be made to the above-described embodiments without departing from the scope of the claims. All such variations, modifications, and combinations are included herein by the scope of this disclosure and the following claims.

The invention claimed is:

1. A method, comprising:
   applying, by a horn as controlled by a controller, a first pulse of ultrasonic vibration to a first workpiece and a second workpiece until a measured value meets or exceeds a preset threshold value, wherein the first pulse of ultrasonic vibration is applied to a first workpiece and a second workpiece at an overlapping portion of the workpieces;

measuring, over time during the first pulse, by the controller, a dissipated power and a horn position;

determining, by the controller:
  a duration of a stage as a difference between:
    an end time of the stage based on a time when the controller stops ultrasonic vibration; and
    a start time of the stage based on a drop in the dissipated power over time;
  a horn displacement during the stage based on a difference between:
    a first horn position measured at the start time of the stage; and
    a second horn position measured at the end time of the stage; wherein the horn position over time includes the first horn position and the second horn position; and
  a weld strength value based on weld strength data, the duration of the stage, and the horn displacement during the stage; and comparing, by the controller, the weld strength value to a threshold weld strength value.

2. The method of claim 1, wherein the weld strength data is measured prior to applying the first pulse.

3. The method of claim 2, wherein the weld strength data is measured with workpieces that are equivalent to the workpieces.

4. The method of claim 1, further comprising determining, by the controller:
  that a weld quality is acceptable if the weld strength value is greater than the threshold weld strength value; and
  that the weld quality is not acceptable if the weld strength value is less than the threshold weld strength value.

5. The method of claim 4, wherein the applying, measuring, determining, comparing, and determining steps are repeated until the weld quality is acceptable.

6. The method of claim 4, further comprising applying, by the horn as controlled by the controller, a second pulse of ultrasonic vibration to the workpieces until a measured value meets or exceeds a preset threshold value.

7. The method of claim 6, further comprising repeating the measuring, determining, and comparing steps for the second pulse.

8. The method of claim 6, wherein the second pulse is applied after a cooling period in which the workpieces cool.

9. The method of claim 6, further comprising adjusting a value of at least one welding parameter of the second pulse such that the value of the at least one welding parameter of the second pulse is different than a value of the at least one welding parameter of the first pulse.

10. The method of claim 9, wherein the welding parameter includes one or more of: welding time, welding energy, and welding pressure.

11. The method of claim 10, wherein adjusting at least one welding parameter comprises, if the horn displacement during the stage and the duration of the stage are below a selected threshold, increasing at least one of welding time, welding energy, and welding pressure.

12. The method of claim 1, wherein the preset threshold value is one of an amount of weld energy, an amount of welding time, and a horn position relative to a start position.

13. A system, comprising:
  a horn;
  a controller, configured to:
    apply, by the horn, a first pulse of ultrasonic vibration to the workpieces until a measured value meets or exceeds a preset threshold value;
    measure, over time and during the first pulse, a dissipated power and a horn position;
    determine:
      a duration of a stage as a difference between:
        an end time of the stage based on a time when the controller stops ultrasonic vibration; and
        a start time of the stage based on a drop in the dissipated power over time;
      a horn displacement during the stage based on a difference between:
        a first horn position measured at the start time of the stage; and
        a second horn position measured at the end time of the stage,
      wherein the measured horn position includes the first horn position and the second horn position; and
      a weld strength value based on weld strength data, the duration of the stage, and the horn displacement during the stage; and
    compare the weld strength value to a threshold weld strength value.

14. The system of claim 13, wherein the weld strength data is determined prior to applying the first pulse.

15. The system of claim 13, wherein the controller is further configured to determine:
  that a weld quality is acceptable if the weld strength value is greater than the threshold weld strength value; and
  that the weld quality is not acceptable if the weld strength value is less than the threshold weld strength value.

16. The system of claim 15, wherein, if the weld quality is not acceptable, the controller is configured to apply, by the horn, a second pulse of ultrasonic vibration to the workpieces until a measured value meets or exceeds a preset threshold value.

17. The system of claim 16, wherein the controller is configured to repeat the measure, determine, and compare steps for the second pulse.

18. The system of claim 16, wherein the controller is configured to adjust a value of at least one welding parameter of the second pulse such that the value of the at least one welding parameter of the second pulse is different than a value of the at least one welding parameter of the first pulse, wherein the welding parameter is one of: welding time, welding energy, and welding pressure.

19. The system of claim 13, wherein the preset threshold value is one of an amount of weld energy, an amount of welding time, and a horn position relative to a start position.

20. A computer-readable medium comprising instructions that, when executed by a processor, cause the processor to:
  apply, by a horn, a first pulse of ultrasonic vibration to a first workpiece and a second workpiece until a measured value meets or exceeds a preset threshold value, wherein the first pulse of ultrasonic vibration is applied to a first workpiece and a second workpiece at an overlapping portion of the workpieces;
  measure, over time during the first pulse, a dissipated power and a horn position;
  determine:
    a duration of a stage as a difference between:
      an end time of the stage based on a time when the controller stops ultrasonic vibration; and
      a start time of the stage based on a drop in the dissipated power over time;

a horn displacement during the stage based on a difference between:
   a first horn position measured at the start time of the stage; and
   a second horn position measured at the end time of the stage; wherein the measured horn position includes the first horn position and the second horn position; and
a weld strength value based on weld strength data, the duration of the stage, and the horn displacement during the stage; and
compare the weld strength value to a threshold weld strength value.

\* \* \* \* \*